INVENTOR
S.Y. TONG
BY Lucian C. Canepa
ATTORNEY

FIG. 3A
TRANSMITTED SEQUENCE
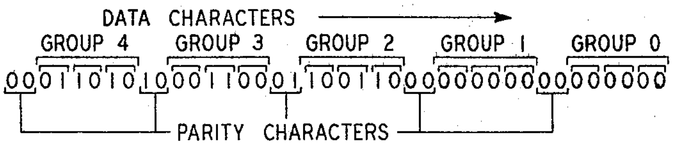
FIG. 3B
RECEIVED SEQUENCE
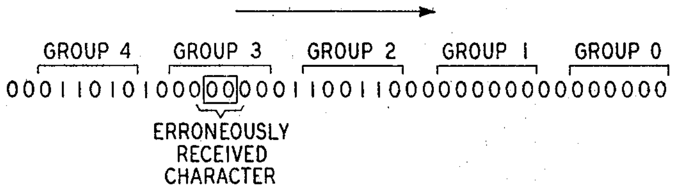
FIG. 3C
STAGES IN DECODING THE RECEIVED SEQUENCE
| DATA IN SHIFT REGISTER 236 | | | LOCATOR WORD | ERROR PATTERN WORD | ERROR INDICATION |
|---|---|---|---|---|---|
| 1. GROUP 1 & 0 | 000000 | 000000 | 00 | 00 | NO ERROR |
| SHIFT | | | | | |
| 2. GROUP 2 & 1 | 100110 | 000000 | 00 | 00 | NO ERROR |
| SHIFT | | | | | |
| 3. GROUP 3 & 2 | 000000 | 100110 | 11 | 00 | NO ERROR |
| SHIFT | | | | | |
| 4. GROUP 4 & 3 | 011010 | 000000 | 01 | 11 | ERROR-NO MATCH |
| DIVIDE BY α | | | | | |
| 5. | | CHARACTERS BEING EXAMINED | 11 | 11 | ERROR-MATCH (INDICATES SECOND CHARACTER OF GROUP 3 IS IN ERROR) |

FIG. 5

| TIME | DATA INPUT | CONTENTS OF REGISTER 410 | CONTENTS OF REGISTER 434 | OUTPUT |
|---|---|---|---|---|
| $t_\alpha=0$ | $x_0$ | $x_0$ | $x_0+\left[\sum_{i=0}^{b-2}\alpha^i x'_i\right]$ | $x_0$ |
| $t_\alpha=1$ | — | $\alpha^{-1}x_0$ | $x_0+\left[\sum_{i=0}^{b-2}\alpha^i x'_i\right]$ | — |
| $t_\alpha=0$ | $x_1$ | $\alpha^{-1}x_0+x_1$ | $\left[x_0+x_1\right]+\left[\sum_{i=0}^{b-2}\alpha^i x'_i\right]$ | $x_1$ |
| $t_\alpha=1$ | — | $\alpha^{-1}\left[\alpha^{-1}x_0+x_1\right]$ | $\left[x_0+x_1\right]+\left[\sum_{i=0}^{b-2}\alpha^i x'_i\right]$ | — |
| $t_\alpha=0$ | $x_2$ | $\alpha^{-1}\left[\alpha^{-1}x_0+x_1\right]+x_2$ | $\left[x_0+x_1+x_2\right]+\left[\sum_{i=0}^{b-2}\alpha^i x'_i\right]$ | $x_2$ |
| ⋮ | ⋮ | ⋮ | ⋮ | ⋮ |
| $t_\alpha=1$ | $x_{b-2}$ | $\alpha^{-1}\left[\alpha^{-1}(---)\right]+x_{b-2}$ | $\left[x_0+x_1+---+x_{b-2}\right]+\left[\sum_{i=0}^{b-2}\alpha^i x'_i\right]$ | $x_{b-2}$ |
| $t_\alpha=1$ | — | $\alpha^{-(b-1)}x_0+---+\alpha^{-1}x_{b-2}$ | $\left[x_0+x_1+---+x_{b-2}\right]+\left[\sum_{i=0}^{b-2}\alpha^i x'_i\right]$ | — |
| $t_p=1$ | | 0 | $\left[\sum_{i=0}^{b-2}\alpha^i x_i\right]$ | $\left[x_0+x_2+---+x_{b-2}\right]+\left[\sum_{i=0}^{b-2}\alpha^i x'_i\right]$ |

United States Patent Office 3,508,197 Patented Apr. 21, 1970

3,508,197
SINGLE CHARACTER ERROR AND BURST-ERROR CORRECTING SYSTEMS UTILIZING CONVOLUTION CODES

Shih Y. Tong, Middletown, N.J., assignor to Bell Telephone Laboratories, Incorporated, Murray Hill and Berkeley Heights, N.J., a corporation of New York Filed Dec. 23, 1966, Ser. No. 604,226
Int. Cl. H03k *13/34;* H04l *1/10*
U.S. Cl. 340—146.1 4 Claims

ABSTRACT OF THE DISCLOSURE

A system is disclosed for utilizing a convolution code of rate $(2^l-1)/2^l$ to correct any number of bit errors in a single character of *l*-bit length. The correction is accomplished at a receiving terminal by generating from a received sequence of characters an error pattern word which identifies the erroneous bits of the character in error and a locator word which identifies which of the received characters contains the arroneous bits. Upon detection of an erroneous character, the error pattern word is added to the erroneous character to obtain the corrected version thereof. By appropriate interleaving of characters, the system can also be used for burst-error correction.

This invention relates to data transmission and processing systems and more particularly to error detection and correction in such systems.

The need for accurate transmission and processing of digital data is well recognized in such areas as telegraphy, telephony, and computer and automation technology. Most often such digital data is represented or coded in sequences of binary signals (hereafter referred to as bits). Each position in any sequence or data character consists of a bit "0" or "1," the different data character permutations of bits representing different items of information. Of course longer messages can be represented by combinations of characters just as symbols of the alphabet are used to construct words and then words used to construct sentences.

Methods of improving accuracy of transmission range from simple single-bit error detection schemes requiring the appending of a single bit to each data character to be transmitted to more elaborate schemes of error correction requiring the numerous interspersing of parity check bits among the information bits. Such schemes as the last mentioned have specifically been employed to correct a type of error known as burst error (errors occurring in "bunches"). Burst-error, as is well known, is the most common type of digital data error occurring on telephone circuits. For this reason, considerable interest has centered on finding efficient burst-error correcting schemes.

Burst-error correcting schemes in general require a certain guard space of error-free digits between the error bursts in order to correct the erroneous digits. Of course, the longer the guard space, the less efficient is the error-correcting ability of the code.

Accordingly, it is an object of this invention to provide an error-correcting system for correcting all digital errors occurring in a single character of information.

Another object of the present invention is to provide an improved burst-error correcting system.

Still another object of the present invention is to provide systems for correcting single character errors and burst errors requiring very short guard spaces between errors.

A further object of the present invention is to provide for single character error and burst-error correction in an efficient and economical fashion.

These and other objects of the present invention are realized in a specific illustrative system embodiment which includes an encoder and decoder connected by a noisy channel. The encoder includes a shift register to which binary information digits are applied. A number of parity check digit circuits are connected to the various stages of the shift register for generating parity check digits having a fixed relationship with the information digits from which they are generated. In particular, the information digits are encoded in a convolution code consisting of *l*-bit characters and having a rate up to $(2^l-1)/2^l$. A timing circuit connected to the output of the encoder causes the gating of alternate groups of information characters and parity check characters onto the noisy channel.

At the decoder, specific numbers of the received characters are processed to obtain what may be called an error-pattern word and a locator word. The locator word identifies which one of the received characters being processed contains erroneous digits, while the error-pattern word indicates which bits in the erroneous character are in error. After determining which character is in error, the error-pattern word is added to the erroneous character (modulo 2) to obtain the originally transmitted error-free character. This single-character error correction can be performed if the distance between erroneous characters is at least $$\frac{1+R}{1-R}$$

where R is the code rate, that is, $$R=\frac{\text{number of information characters transmitted}}{\text{number of information plus parity characters transmitted}}$$

This distance is known as the guard space.

With slight modifications, the above system can be utilized for burst-error correction of efficiency as good or better than existing burst-error correcting systems. This is accomplished by interleaving the characters before transmission and separating the interleaved characters for decoding at the receiving end.

It is a feature of this invention that the encoder of a data transmission system include parity generating circuits for forming *l*-bit parity characters from *l*-bit information characters such that with the selective interspersing of the parity characters with the information characters a convolution code of rate up to $$\frac{2^l-1}{2^l}$$

is formed.

It is another feature of the present invention that the decoder of a data transmission system include circuitry for generating both an *l*-bit locator word for identifying which one of a group of received characters contains erroneous bits and an *l*-bit error pattern word for identifying which bits of the erroneous characters are in error, providing the distance between erroneous characters is at least $$\frac{1+R}{1-R}$$

where R is the code rate.

It is still another feature of the present invention that the decoder include circuitry for adding (modulo 2) the error pattern word to the erroneous character to obtain a corrected version of the erroneous character.

It is another feature of the present invention that a single character error correcting data transmission system include circuitry for interleaving the encoded data characters before transmission and for separating the interleaved characters after receiving and before decoding the characters.

A complete understanding of the present invention and of the above and other features and advantages thereof may be gained from a consideration of the following detailed description of an illustrative embodiment thereof presented hereinbelow in connection with the accompanying drawings, in which:

FIGS. 3A, 3B and 3C show illustrative data sequences as they would be encoded and decoded by the system shown in FIG. 2;

FIG. 5 shows progressive stages of the encoding of $b-1$ data characters by the encoder of FIG. 4A.

Figure 6:
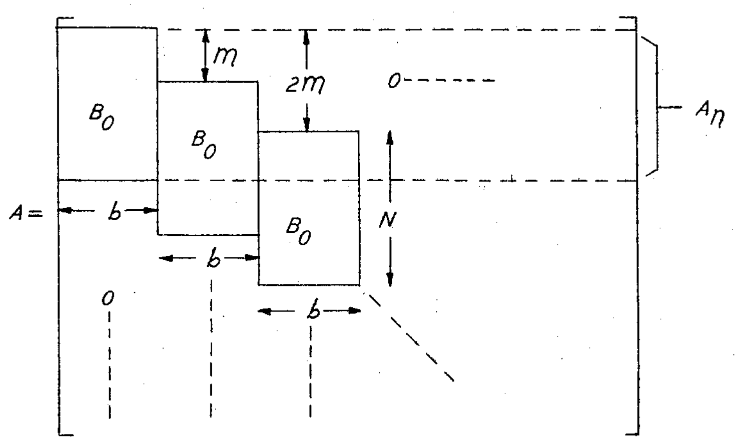
FIG. 6 shows a generalized parity check matrix for a convolution code.

Before discussing the details of FIG. 1, a general description of convolution codes and a specific description of the type of convolution code used with the present invention will be given. A convolution or recurrent code may be defined as a set of digital sequences which satisfy a set of parity check equations where the parity check matrix is of the following form. (In this connection, see Wyner, A. D. and Ash, R. B., "Analysis of Recurrent Codes," IEEE Transactions on Information Theory, pp. 143–150, July 1962.) Let $B_0$ be a semi-infinite matrix with $b$ columns, an infinite number of rows, and a finite number of non-zero entries. The parity check matrix A is then formed as shown schematically in FIG. 6.

All entries of the A matrix other than the $B_0$ blocks are zeroes. The parameter $b$ is determined as the smallest integer such that an N by $b$ matrix $B_0$ can generate the matrix A (i.e., if $B_0$ is specified, then A may be determined). $A_N$ is a matrix comprised of the first N rows of the matrix A and is sufficient to always reconstruct the matrix A. $A_N$ will hereafter be referred to as the "code defining" matrix. The code words of a convolution code may now be defined as semi-infinite sequences X which satisfy the equation $$A \cdot X = 0$$

Let $x_i$ represent the $i^{th}$ entry or characters of the code word X. The first $m$ rows of A may be thought of as $m$ equations in the $b$ unknowns $x_1 \ldots x_b$. Assuming that the first $m$ rows of A are linearly independent, $b-m$ of the first $b$ characters of X may be chosen arbitrarily. Once $x_1 \ldots x_b$ have been chosen to satisfy the first $m$ equations, the next $m$ rows of A may be utilized as $m$ equations in the $b$ unknown $x_{b+1} \ldots x_{2b}$. The procedure may be repeated for each block of $b$ characters; $b-m$ characters in each block may be chosen arbitrarily and the remaining $m$ characters are determinable from the $m$ equations (referred to hereafter as parity check equations). Thus there are $m$ check characters for every $b$ characters of X giving a redundancy of $m/b$ or a rate of $$\frac{b-m}{b}$$

(i.e., $b-m$ information characters for every $m$ parity check characters).

The present invention utilizes a convolution code as generally described above for single character correction, each character comprising $l$ bits with $m=1$. The specific convolution code employed may be characterized by the following $B_0$ matrix, $$B_0 = \begin{bmatrix} I_l & I_l & \ldots & I_l & I_l \\ \alpha^0 & \alpha & \ldots & \alpha^{b-2} & 0 \end{bmatrix}$$

where $I_l$ is the identity element of $GF(2^l)$ and $\alpha$ is a primitive element of $GF(2^l)$, that is, $\alpha$ is a root of an irreducible polynominal $g(x)$ such that $\alpha$ generates the elements of $GF(2^l)$. As can be seen from above, the $B_0$ matrix is a 8 by $b$ character matrix or $2l$ by $bl$ bit matrix, where $b \leq 2^l$.

The parity check matrix A is now formed as $$A = \left[ \begin{array}{cc} \begin{bmatrix} I_l & I_l & \cdots & I_l & I_l \\ \alpha^0 & \alpha & \cdots & \alpha^{b-2} & 0 \end{bmatrix} & \begin{bmatrix} I_l & I_l & \cdots & I_l & I_l \\ \alpha^0 & \alpha & \cdots & \alpha^{b-2} & 0 \end{bmatrix} \end{array} \right] \Big\} A_N$$

Using the code defining matrix $A_N$ and noting that $\alpha^0 = I_l$, the parity check characters may now be determined from the following equation. (A parity check character will be defined as a character which when added to the sum of a sequence of information characters gives a zero character.)

$$\begin{bmatrix} I_l & I_l & \cdots & I_l & I_l & 0 & 0 & \cdots & 0 \\ I_l & & \cdots & \alpha^{b-2} & 0 & I_l & I_l & \cdots & I_l \end{bmatrix} \cdot \begin{bmatrix} x_0 \\ x_1 \\ x_{2b-1} \end{bmatrix} = 0$$

Of the characters $x_0, x_1 \ldots x_{2b-1}$, $2b-2$ are to be information characters and the two remaining characters are to be parity check characters. Multiplying out the above equation gives, $$\begin{bmatrix} x_0 + x_1 \cdots + x_{b-1} \\ x_0 + \alpha x_1 + \cdots + \alpha^{b-2} x_{b-2} + x_b + \cdots x_{2b-1} \end{bmatrix} = \begin{bmatrix} 0 \\ 0 \end{bmatrix}$$

Thus $$x_0 + \alpha x_1 + \ldots + \alpha^{b-2} x_{b-2} + x_b + \ldots + x_{2b-1} = 0$$

or $$x_{2b-1} = x_0 + \alpha x_1 + \ldots + \alpha^{b-2} x_{b-2} + x_b + \ldots x_{2b-2} \quad (1)$$

and $$x_0 + x_1 + \ldots x_{b-1} = 0$$

or $$x_{b-1} = x_0 + x_1 + \ldots x_{b-2} \quad (2)$$

where $x_{2b-1}$ and $x_{b-1}$ are the parity characters determined from the $2b-2$ information characters. Actually, only equation 1 need be used to determine the parity characters. At the beginning of the encoding process, $b-1$ information characters along with $b$ zero characters would be used in Equation 1 to obtain the first parity character. The next parity character would be obtained again using the $b-1$ information characters, along with a next group of $b-1$ information characters in Equation 1. The third parity character is obtained from Equation 1 using the second group of $b-1$ information characters, and a new third group of $b-1$ characters, etc. In this fashion, a parity character may be generated for every $b-1$ information characters.

The decoding of the convolution code described above is accomplished by first multiplying a received sequence of $2b$ characters by the matrix $A_N$ to obtain, $$\begin{bmatrix} I_l & I_l & \cdots & I_l & I_l & 0 & 0 & \cdots & 0 \\ I_l & \alpha & \cdots & \alpha^{b-2} & 0 & I_l & I_l & \cdots & I_l \end{bmatrix} \begin{bmatrix} y_0 \\ y_1 \\ y_{2b-1} \end{bmatrix} = \begin{bmatrix} y_0 + y_1 + \cdots + y_{b-1} = S_0 \\ y_0 + \alpha y_1 + \cdots + y_{2b-1} = S_1 \end{bmatrix} \quad (3)$$

(Of course, it is tacitly assumed that there are no errors in the previous "guard space" block of characters.) The symbol $S_0$, which will be called the error pattern word, represents the first $l$ bits of the syndrome obtained from the multiplication. The symbol $S_1$, called the locator word, represents the last $l$ bits of the syndrome. If none of the $2b$ received characters contains errors, then, as is evident from the discussion on encoding, $S_0$ and $S_1$ will contain all zeros. If a single character contains errors, say the $i^{th}$ character with error pattern $e_i$, then $S_0$ will indicate which bits in the erroneous character are in error (ie.,$S_0=e_i$), and the locator word $S_1$ will provide information as to which of the first group of $b$ characters received of the $2b$ characters being examined is in error (i.e., $S_1=\alpha^ie_i$). It follows that $S_1=\alpha^ie_i=\alpha^iS_0$. Thus in order to determine if the $i^{th}$ character is in error, $S_1$ is divided by $\alpha^i$ and the result compared with $S_0$. If they are equal, the $i^{th}$ character is indicated to be in error, and the corrected version of the $i^{th}$ character may be obtained by adding the error pattern word $S_0$ to the character. (The notation used assumes the first character examined in the $0^{th}$ character and thus $S_1/\alpha^0$ or simply $S_1$ is compared with $S_0$ to determine if the character is in error.)

If interleaving of characters is employed with the above-described encoding and decoding processes, burst-error correction of high efficiency can be obtained. In particular, bursts of length $(i-1)l+1$ bits can be corrected when interleaving of degree $i$ is employed (i.e., $i$ groups of characters at a time are interleaved) and if the interval between bursts is at least $il$ $(2b-1)$ bits.

Figure 1:
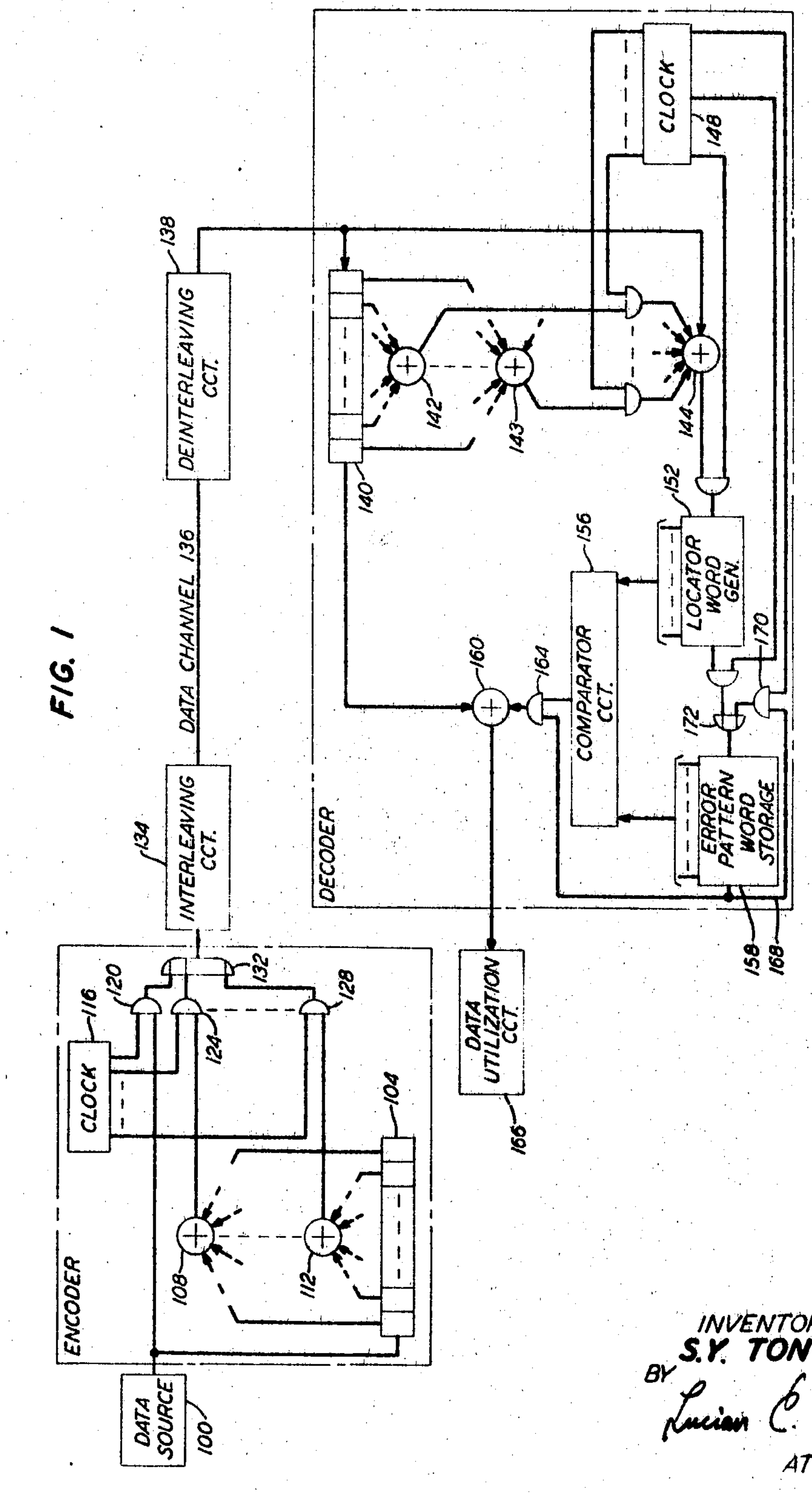
FIG. 1 depicts a generalized, illustrative information processing system made in accordance with the principles of the present invention.

FIG. 1 shows an illustrative single character error or burst-error correcting system utilizing the principles of the present invention. A description of the system of FIG. 1 will first be given assuming that no interleaving of characters is done (i.e., assuming that the interleaving circuit 134 and de-interleaving circuit 138 are not present in the system). Data characters, $l$ bits long, are applied to a shift register 104 and an AND gate 120 from a source 100. With appropriate pulses from a clock 116, the gate 120 is enabled, thus transferring the data characters through an OR gate 132 to a data channel 136 which is subject to noise. Concurrent with the application of the data characters to the shift register 104, and as the data characters are being shifted into the register, one-half of the contents of the register are shifted out. The resulting contents of the shift register 104 are then added (modulo 2) by the EXCLUSIVE-OR gates 108 . . . 112 ($l$ in number) in various combinations to obtain a parity character of $l$-bit length. This character is then applied to the data channel 136 via AND gates 124 through 128 and OR gate 132. With each application of a group of data characters from the data source 100 to the shift register 104, the process is repeated.

The addition of the contents of the shift register 104 to obtain the parity characters is determined according to the mathematical rules discussed earlier which, of course, requires the designation of some $\alpha$ which is the primitive root of an irreducible polynomial $g(x)$ such that $\alpha$ generates the elements of $GF(2^l)$. This $\alpha$ will be referred to again when discussing the decoding process.

A shift register 140 connected to the other end of the data channel 136 registers the received data characters in the right half of the register. The left half of the register contains the previously-received group of data characters. Each bit of the subsequently-received parity character is applied to an EXCLUSIVE-OR gate 144 where it is there added (modulo 2) to a particular output of one of a number of EXCLUSIVE-OR gates 142 through 143. These last-mentioned outputs are formed by adding (modulo 2) various combinations of bits of the data characters stored in the register 140. The word obtained from adding the received parity character bits to the outputs of the EXCLUSIVE-OR gates 142 through 143, referred to as the locator word discussed earlier, is shifted into a locator word generator 152. As each bit of the locator word is shifted into the generator 152, a bit of the locator word used in the preceding decoding process is shifted into an error pattern word storage register 158. This word is to be the error pattern word for the present decoding process. The functions of the locator word and the error pattern word, which together make up the syndrome of the sequence currently stored in the shift register 140, were explained earlier.

The locator word and the error pattern word are then compared in a comparator circuit 156. The following three conditions are of concern re this comparison:

(1) Both the locator word and the error pattern word contain all-zero entries.

(2) The error pattern word and the locator word contain non-zero entries and are identical.

(3) The error pattern word contains non-zero entries but does not match the locator word.

If condition (1) is detected, then it is assumed that no character of the group of $b$ characters being examined is in error. In this case, the group of $b$ characters is shifted out of the shift register 140 to an EXCLUSIVE-OR gate 160 and to an associated data utilization circuit 166 in preparation for receiving the next group of $b$ characters.

The presence of condition (2) indicates that the *first* received character of the group of $b$ characters being examined contains errors. Upon detection of the match between the error pattern word and the locator word, the comparator circuit 156 in conjunction with the output of the error pattern word storage 158 enable AND gate 164 thus causing the application of the error pattern word to the EXCLUSIVE-OR gate 160. The error pattern word is applied thereto simultaneously with the application from the shift register 140 of the data character determined to be in error. In this fashion, the error pattern word is added (modulo 2) to the erroneous data character to obtain the corrected version of the data character. After the erroneous data character is corrected, the characters of the group in question are shifted out of the shift register 140 to the data utilization circuit, in preparation for the next group to be received.

Condition (3) indicates that a character is in error but that it is *not* the first received character. In this case, logical operations are performed on the locator word by the locator word generator 152 to obtain a new locator word which is equal to the former locator word divided by $\alpha$ (mentioned earlier in giving a mathematical description of the decoding process). While this is taking place, the first received character is shifted out of the shift register 140 to the utilization circuit. The new locator word is then compared with the error pattern word in the comprator circuit 156. A match indicates that the second received character is in error, in which case the error pattern word is added (modulo 2) to this second character by the EXCLUSIVE-OR gate 160 as the character is shifthed out of the shift register 140. If a mismatch occurs indicating the second received character is not in error, the character is shifted out of the shift register 140 and the current locator word is divided by $\alpha$ in the locator word generator 152 to obtain still another locator word. The process continues as described above during which time the erroneous character is corrected.

The shift register 140 and the error pattern word storage 158 are synchronized so that as an information character bit is shifted out of the shift register 140, a bit of the error pattern word is shifted out of and then re-applied to the error pattern word storage 158 via a lead 168, an AND gate 170, and an OR gate 172. The information character bit and the error pattern word bit occupy corresponding bit positions in the information character and the error pattern word respectively.

Figure 2:
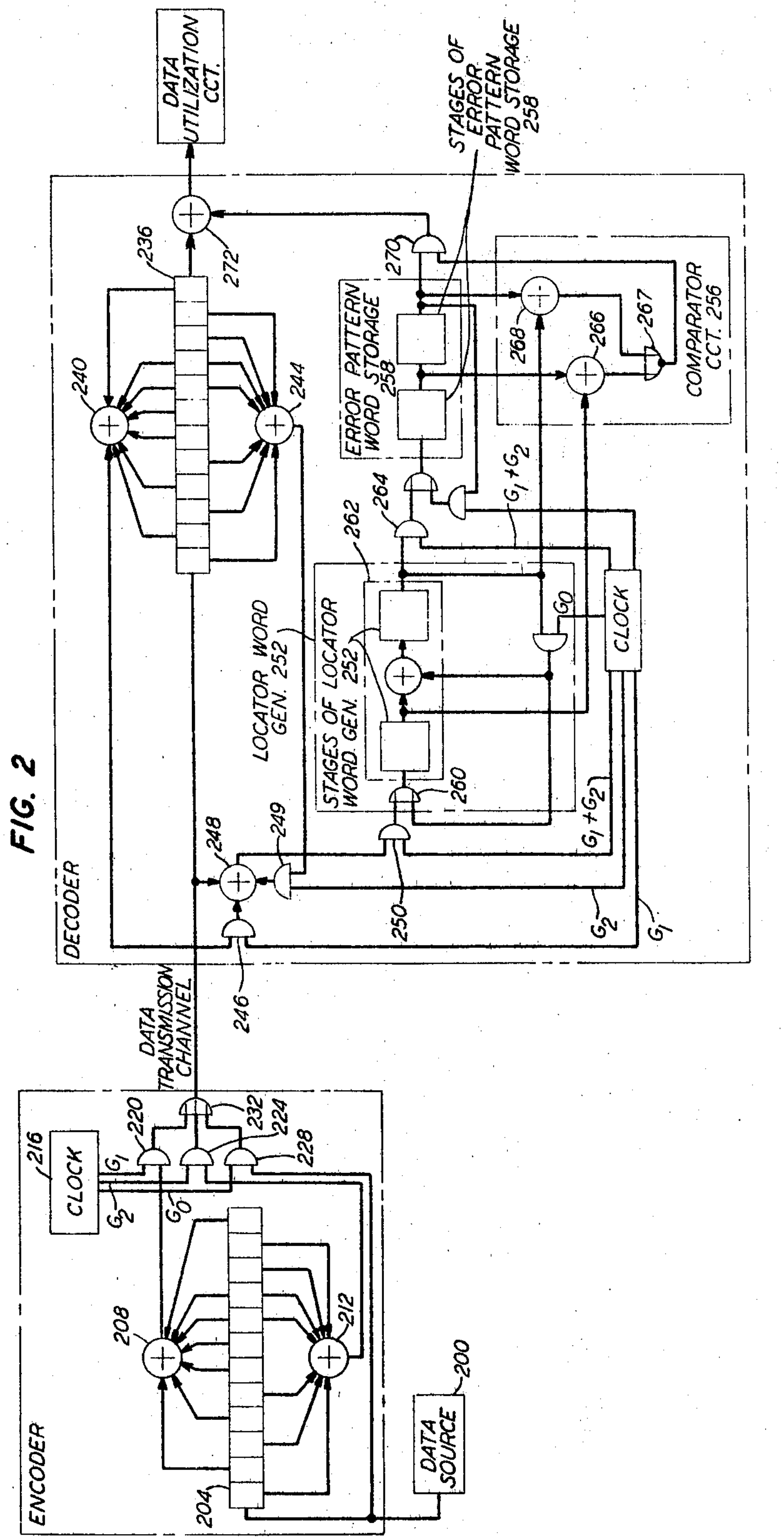
FIG. 2 shows a specific illustrative single-character error correcting system which utilizes a convolution code having 2-bit characters and a rate of ¾.

FIG. 2 shows a specific embodiment of a single two-bit character error-correcting system utilizing the principles of the present invention. FIGS. 3A, 3B and 3C, showing an illustrative transmitted and received sequence of data and parity characters and the stages in decoding the sequence, will be used in explaining the operation of the system shown in FIG. 2.

Before describing the physical operation of the system shown in FIG. 2, it may be helpful to describe the code utilized by the system in the algebraic terms used earlier. In particular for the code used, $l=2$ so that the rate of the code can be as high as $$R=\frac{2^2-1}{2^2}=\frac{3}{4}$$

which is the rate used in this example. The irreducible polynomial chosen to derive the code is $$g(x)=1+x+x^2$$

Letting $x=\alpha$, which as was mentioned earlier in the primitive root of $g(x)$, we obtain:

$$g(\alpha)=1+\alpha+\alpha^2=0$$

or $$\alpha^2=1+\alpha$$

Using the natural 2-tuple representation of the powers of $\alpha$, we get:

$$\alpha^0=1 \qquad =10$$
$$\alpha^1=\alpha \qquad =01$$
$$\alpha^2=1+\alpha \qquad =11$$
$$\alpha^3=\alpha\cdot\alpha^2=\alpha+\alpha^2=\alpha^0=10$$

Now consider the data character groups 2 and 3 of FIG. 3A. Applying Equation 1 derived earlier to these characters and again noting that $b=4$, the parity check character may be obtained as follows. From Equation 1, $$x_{2b-1}=x_0+\alpha x_1+ \ldots +\alpha^{b-2}x_{b-2}+x_b+ \ldots +x_{2b-2}$$

or $$x_7=x_0+\alpha x_1+\alpha^2x_2+x_4+x_5+x_6$$

Substituting in the particular data characters from groups 2 and 3 of FIG. 3A (reading the data from right to left) and noting that $(10)=\alpha^0$ and $(01)=\alpha$, the following is obtained $$x_7=\underbrace{\underbrace{01}+\alpha\underbrace{(10)}+\alpha^2\underbrace{(01)}}_{\text{group 2}}+\underbrace{00+11+00}_{\text{group 3}}$$

or $$x_7=\alpha+\alpha\cdot\alpha^0+\alpha^2\cdot\alpha+\alpha^2$$
$$=\alpha+\alpha+\alpha^3+\alpha^2$$
$$=01+01+10+11=01$$

The first bit of the parity character $x_7$ which would be transmitted would be the "0" bit followed by the "1" bit. In FIG. 3A, this parity character is shown between groups 3 and 4. The other parity characters may be obtained in a similar fashion.

The encoder shown in FIG. 2 comprises a twelve-bit or six-character shift register 204, the various stages of which are connected to two EXCLUSIVE-OR gates 208 and 212. Gates 208 and 212 generate the first and second bits respectively of the parity check characters. As a group of three characters are being applied from a data source 200 to the shift register 204, an AND-gate 228 is enabled by a clock 216 thus transferring the three characters onto a data transmission channel. Thereafter, a parity check character is generated by the EXCLUSIVE-OR gates 212 and 208 by adding (modulo 2) selected portions of the contents of the shift register 204. The contents at this particular stage consist of the three characters mentioned above in the left-most portion of the register and the three previously-received characters in the right-most portion. The AND-gate 220 would first be enabled by the clock 216, followed by enabling of the AND-gate 224, to transfer the first and second bits respectively of the parity character onto the data channel. Thus assuming that data character groups 2 and 3 of FIG. 3A are registered in the shaft register 204 (data group 2 being in the right-most portion), it can be seen that the parity character 10 would be generated as shown in FIG. 3A. Thereafter, data group 2 would be shifted out of the shift register 204, data group 3 would be shifted from the left portion to the right portion of the register and data group 4 would be applied to and registered in the left portion of the register.

Now assume that of the transmitted sequence shown in FIG. 3A both bits of the second data character of group 3 are received in error, i.e., that the bits are changed from 11 to 00, as shown in FIG. 3B. The various stages of the decoding of the received sequence will now be discussed with reference to FIG. 3C.

In particular, upon receiving and registering data group 1 in a shift register 236 of the decoder, group 0 having been previously received and registered, the locator word and error pattern, both 00, are generated. This is shown in FIG. 3C in the first row of the table. The all-zero error pattern word indicates that data group 0 contains no erroneous characters. Even though an all-zero error pattern word is present, the decoding procedure of comparing the error pattern word registered in an error pattern word storage 258 with the locator words registered in a locator word generator 252 is carried out. In the present example, since there are three characters per group, three comparisons are made. As discussed earlier, after each comparison and before the next comparison, the locator word is processed by logically dividing the word by the primitive root $\alpha$. These steps are shown only for the decoding of groups 3 and 4 in FIG. 3C since in this example it is only with these groups that such steps are of significance.

After the decoding of groups 0 and 1, the last derived locator word which is registered in the locator word generator 252 is shifted into the error pattern storage 258 to become the error pattern word for the next decoding operation. This is indicated in FIG. 3C by the arrow from the locator word in the first row of the table to the error pattern word of the second row. Also, the contents in the left part of the decoder shift register are shifted to the right part. This is shown in FIG. 3C by the arrow from six left-most bits of the data sequence of the first row of the table to the right-most bits of the sequence of the second row.

The decoding of groups 3 and 4 will now be discussed in detail. After group 4 has been received and registered in the shift register 236, the parity check bit "1" is generated by an EXCLUSIVE-OR gate 240 by the adding (modulo 2) of the contents of selected stages of the shift register 236. This check bit is then applied via AND-gate 246 to an EXCLUSIVE-OR gate 248 where it is added to the first received bit of the transmitted parity check character of groups 3 and 4—that is, to bit "0" as shown in FIG. 3A. The output of the EXCLUSIVE-OR gate 248—bit "1"—is applied via AND-gate 250 and OR-gate 260 to the locator word storage 262. This causes the shifting of the contents of the locator word storage 262 and the error pattern word storage 258 one stage to the right, the contents of the second stage of the locator word storage 262 being shifted via an AND-gate 264 to the first stage of the error pattern word storage 258. A second parity check bit is generated by EXCLUSIVE-OR gate 244 and added by the EXCLUSIVE-OR gate 248 to the second bit of the transmitted parity check character to obtain bit "1" which is then shifted into the locator word storage 262. The contents of the locator word storage 262 and the error pattern word storage 258 after the above procedure is shown on the fourth row of the table of FIG. 3C.

The matching process and new locator word generation process is now commenced. After each comparison of the locator word with the error pattern word, in a comparator circuit 256, a new locator word is generated. This is done by adding (modulo 2) the two bits of the present locator word, and shifting the result into the second stage of the locator word storage 262. Also, the contents of the second stage is shifted into the first stage.

The above operation corresponds to the logical division of the locator word by $\alpha$, the primitive root of the chosen generator polynomial.

After the comparison of the locator word 01 and the error pattern word 11, of the present example, and the shifting of the first character 00 of group 3 from the shift register 236 to the utilization circuit, the locator word is logically divided by $\alpha$ to obtain a new locator word 11 as shown in FIG. 3C. As can be seen, the locator word now matches the error pattern word which indicates (since only a single division was necessary before matching) that the second character of the group being examined (group 3) is in error. Both bits of the error pattern word "1" indicates that both bits of the erroneous character are in error.

The correction of the erroneous character commences as follows. Corresponding bits of the error pattern word and the locator word are added (modulo 2) by EXCLUSIVE-OR gates 266 and 268. If the two words are identical, the output of each EXCLUSIVE-OR gate 266 and 268 is "0" or "low" and thus the output of OR-NOT gate 267 is "1" or "high." This "high" condition, in conjunction with the bits of the error pattern word 11, enables AND-gate 270 which applies a "1" to the EXCLUSIVE-OR gate 272 as the bits of the second character of group 3 emerge from the shift register 236. Thus the error pattern word 11 is added (modulo 2) to the erroneous character 00, to obtain the corrected character 11 (the character originally transmitted) which is then applied to the data utilization circuit. The subsequent decoding process continues as described above.

Figure 4A:
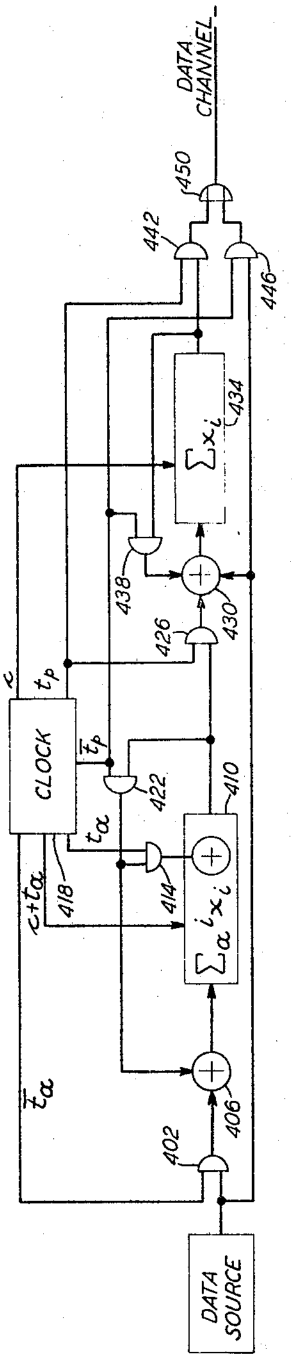
FIG. 4A shows an alternative illustrative encoder for encoding data characters in a single-character error correcting convolution code.
Figure 4B:
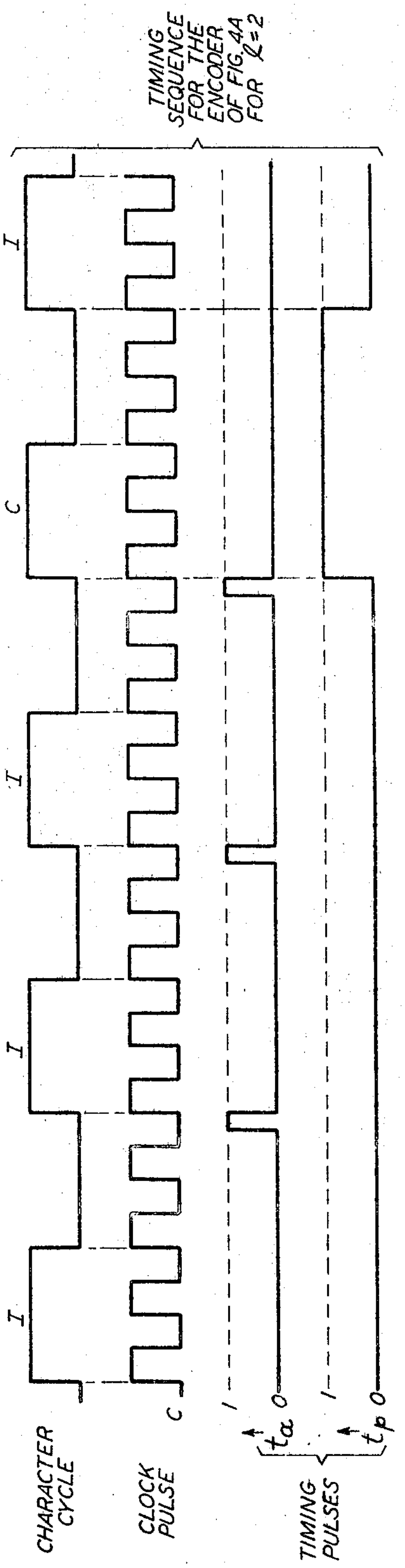
FIG. 4B shows exemplary timing for an encoder of the type shown in FIG. 4A which employs data characters of length two (i.e., $l=2$)

An alternative illustrative encoder for encoding data characters in a convolution code is shown in FIG. 4A. This embodiment requires fewer memory elements than the generalized encoder shown in FIG. 1. Specifically, for encoding $l$-bit characters, only $2l$ stages of storage are required. FIG. 4B shows exemplary timing for an encoder employing data characters of length two (i.e., $l=2$).

In FIG. 4A data characters are applied via AND-gate 402 and an EXCLUSIVE-OR gate 406 to a first register 410. The characters are also applied via an EXCLUSIVE-OR gate 430 to a second register 434 and via AND-gate 446 and OR-gate 450 to a data channel. The contents of progressive states of the registers 410 and 434 and the outputs from OR-gate 450 in the encoding of a group of $b-1$ data characters is shown in FIG. 5. During the information cycle ($t_p=0$), the sums $$\sum_{i=0}^{b-2}\alpha^i x_i \text{ and } \sum_{i=0}^{b-2}\alpha^i x_i' + \sum_{i=0}^{b-2} x_i$$

are formed in registers 410 and 434 respectively, where $\alpha$ is the primitive root chosen to generate the convolution code (as discussed earlier), $x_i$ is the $i^{th}$ character of the group of $b-l$ characters then being applied to the encoder, and $x'_i$ is the $i^{th}$ character of the previous group of $b-1$ characters applied to the encoder. The EXCLUSIVE-OR gate shown in the register 410 of FIG. 4A is a generalized representation of what may be a number of EXCLUSIVE-OR gates for adding the contents of various stages of the register 410. The placement of the EXCLUSIVE-OR gates is determined from the generator polynomial of the code used. In particular, EXCLUSIVE-OR gates are placed after those stages corresponding to the degree of the non-zero terms of the generator polynomial, neglecting the highest and lowest terms. For example, if the generator polynomial were $g(x)=1+x^2+x^3+x^8$, then EXCLUSIVE-OR gates would be placed after the second and third stages of the shift register 410 (i.e., between the second and third and the third and fourth stages).

During the parity check cycle ($t_p=1$), the contents of register 434 are applied to the channel and the contents of register 410 applied to register 434. Subsequent groups of $b-l$ characters applied to the encoder are processed in a similar manner.

It is noted that the last non-zero entry of the third column of FIG. 5 (labeled "Contents of Register 410") is indicated as being equal to the last entry of the fourth column, that is that, $$\alpha^{-(b-1)}x_0+ \ldots +\alpha^{-1}x_{b-2}=\sum_{i=0}^{b-2}\alpha^i x_i$$

This is so because a complete cyclic code is utilized whose "block length" (i.e., group length as used earlier) is $b$. So $\alpha^{-i}=\alpha^{b-i-1}$ and the above equality holds.

The single character error correction scheme disclosed above may also be used for burst error correction if interleaving of characters is employed. In particular, if interleaving of degree $i$ is employed, bursts of $(i-1)l+1$ bits can be corrected provided that the interval between bursts is at least $il(2b-1)$ bits. Thus, if, as in the earlier example for single character correction, $l=2$ and $b=4$, and $i=5$, then error bursts of 9 bits may be corrected provided that there are at least 70 error-free bits between bursts.

Including the interleaving circuit and de-interleaving circuit in the system in FIG. 1, a burst-error correction system utilizing the principles of the present invention is shown. The interleaving circuit 134 and de-interleaving circuit 138 are straightforward embodiments of well-known state of the art devices.

In summary, systems have been disclosed for utilizing convolution or recurrent codes for single-character error correction and for burst-error correction. The single-character error correcting scheme provides for correcting any number of bit errors in a single character of $l$-bit length using a convolution code of rate up to $$\frac{2^l-1}{2^l}$$

The correction is accomplished at the receiving end by generating from the received sequence an error pattern word which identifies the erroneous bits of the character in error and a locator word which identifies which of the received characters contains the erroneous bits. Upon detection of an erroneous character, the error pattern word is added to the erroneous character to obtain the corrected version of the character. By appropriate interleaving, these same convolution codes can be used for burst-error correction.

Finally, it is to be understood that the above-described arrangements are only illustrative of the application of the principles of the present invention. Numerous other modifications and alternative arrangements may be devised by those skilled in the art without departing from the spirit and scope of the invention.

What is claimed is:

1. In combination in a data transmission system containing a source of information, encoding means responsive to said information source for encoding said information in a convolution code comprising $l$-bit length characters and having a specific rate R of up to $$\frac{2l-1}{2^l}$$

means for applying said characters to one end of a transmission channel, and decoding means connected to the other end of said channel for generating $l$-bit locator words and $l$-bit error pattern words from groups of said characters and for adding (modulo 2) particular error pattern words to characters identified by said locator words to thereby correct $\leq l$ erroneous bits in said characters.

2. A combination as in claim 1 wherein said encoding means comprises a first $l$-stage feedback shift register comprising logical circuitry for generating a first signal represented by the expression $$\sum_{i=0}^{b-2} \alpha^i x_i$$

where $a$ is the primitive root of the generator polynomial of said convolution code, $x_i$ is a representation of the $i^{th}$ character of the group of $b-1$ characters being processed by said encoding means, and $$b=\frac{1}{1-R}$$

a second $l$-stage feedback shift register connected to said first shift register comprising logical circuitry for generating a second signal represented by the expression $$\sum_{i=0}^{b-2} x_i$$

and for adding said second signal to a signal represented by the expression $$\sum_{i=0}^{b-2} \alpha^i x'_i$$

previously generated by said first shift register where $x'_i$ is a representation of the $_i{}^{th}$ character of the group of $b-1$ characters previously processed, and means for shifting the result of said addition represented by the expression $$\sum_{i=0}^{b-2} x_i + \sum_{i=0}^{b-2} \alpha^i x'_i$$

from said second shift register to a data transmission channel.

3. A combination as in claim 1 wherein said decoding means comprises, a $2l\ (2^l-1)$ bit stage storage register for receiving and registering said characters and for successively outputting said characters in the same order received, $l$ EXCLUSIVE-OR gates connected to selected stages of said storage register for generating an $l$-bit parity character, an $(l+1)$th EXCLUSIVE-OR gate connected to each of said $l$ EXCLUSIVE-OR gates and to said transmission channel for adding (modulo 2) said parity character to a character received over said transmission channel to thereby obtain an $l$-bit locator word, an $l$-bit locator word generator for receiving and storing locator word and for successively generating $l-1$ other locator words therefrom, an $l$-bit error pattern word storage unit for receiving and registering the last locator word generated by said locator word generator of the previously generated group of $l-1$ locator words, comparator means for successively comparing the contents of said error pattern word storage unit with each locator word received and generated by said locator word generator, and means responsive to said comparator means indicating a match between the contents of said error pattern words storage unit and a locator word for adding (modulo 2) the contents of said error pattern word storage unit to the character presently being outputted by said $2l(2^l-1)$ bit storage register to thereby correct errors in said character.

4. In a data transmission system wherein information is encoded in a convolution code comprising up to $2^l-1$ data characters of length $l$ bit for every $l$-bit parity check character, and wherein said characters are applied to a transmission media, decoding means connected to said transmission media comprising, registering means for receiving, registering and subsequently shifting said characters to a utilization circuit, means connected to said registering means for generating parity characters from said data characters registered in said registering means, means connected to said parity generating means and said transmission media for generating a first $l$-bit locator word and an $l$-bit error pattern word from said generated parity characters and the received parity check characters for generating successive locator words, each locator word being generated by the logical division of the previous locator word by $a$, where $a$ is the primitive root of the generator polynomial of said convolution code, and comparator means connected to said locator word and error pattern word generating means for comparing said error pattern word with each of said locator words and upon matching of said error pattern word with the $j^{th}$ one of said locator words, for adding (modulo 2) said error pattern word to the $j^{th}$ one of said data characters shifted from said registering means thereby obtaining the correct version of said character.

References Cited

UNITED STATES PATENTS 3,155,818 11/1964 Goetz ---------- 340—146.1 X
3,162,837 12/1964 Meggitt ---------- 340—146.1
3,303,333 2/1967 Massey ------------- 235—153

MALCOLM A. MORRISON, Primary Examiner
R. S. DILDINE, Jr., Assistant Examiner